(12) United States Patent
Peeters

(10) Patent No.: US 7,583,742 B2
(45) Date of Patent: *Sep. 1, 2009

(54) MULTI-BAND DMT RECEIVER

(75) Inventor: Miguel Philipe Paul Peeters, Brussels (BE)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/177,800

(22) Filed: Jul. 22, 2008

(65) Prior Publication Data

US 2008/0279309 A1    Nov. 13, 2008

Related U.S. Application Data

(63) Continuation of application No. 09/686,784, filed on Oct. 10, 2000, now Pat. No. 7,406,141.

(30) Foreign Application Priority Data

Aug. 21, 2000    (GB)    ................... 0020624.3

(51) Int. Cl.
*H04K 1/10*    (2006.01)
*H04L 27/28*    (2006.01)

(52) U.S. Cl. .................. 375/260; 375/229; 375/326; 375/340; 375/349

(58) Field of Classification Search .................. 375/260, 375/326, 340, 229, 349
See application file for complete search history.

(56) References Cited

U.S. PATENT DOCUMENTS

| | | |
|---|---|---|
| 5,317,596 A | 5/1994 | Ho et al. |
| 5,365,470 A | 11/1994 | Smith |
| 5,432,632 A | 7/1995 | Watanabe |
| 5,680,388 A | 10/1997 | Kåhre |
| 5,818,296 A | 10/1998 | Lee et al. |
| 5,930,231 A | 7/1999 | Miller et al. |
| 6,055,268 A | 4/2000 | Timm et al. |
| 6,128,276 A | 10/2000 | Agee |
| 6,185,202 B1 | 2/2001 | Gockler et al. |
| 6,246,698 B1 | 6/2001 | Kumar |
| 6,442,195 B1 | 8/2002 | Liu et al. |
| 6,449,246 B1 | 9/2002 | Barton et al. |
| 6,456,657 B1 | 9/2002 | Yeap et al. |

(Continued)

FOREIGN PATENT DOCUMENTS

| | | |
|---|---|---|
| EP | 0 863 644 A2 | 9/1998 |
| EP | 0 912 023 A1 | 4/1999 |
| EP | 0 967 763 A1 | 12/1999 |
| EP | 0 863 644 A3 | 1/2000 |
| EP | 0 969 637 A1 | 1/2000 |

(Continued)

OTHER PUBLICATIONS

Search Report for GB 0020624.3, dated Mar. 13, 2001, 2 pp.
European Search Report for 01307114.7-2415-, dated Sep. 16, 2003, 3 pp.

*Primary Examiner*—Ted Wang
(74) *Attorney, Agent, or Firm*—Sterne, Kessler, Goldstein & Fox P.L.L.C.

(57) ABSTRACT

There is disclosed a receiver for receiving a multi-band DMT signal. The receiver includes a plurality of demodulators, each demodulator having a discrete Fourier transform and being provided to demodulate a respective one of a plurality of bands in the multi-band signal, the multi-band signal being modulated in an inverse discrete Fourier transform. A method of demodulating a multi-band signal is also provided.

18 Claims, 3 Drawing Sheets

U.S. PATENT DOCUMENTS

| | | |
|---|---|---|
| 6,470,055 B1 | 10/2002 | Feher |
| 6,496,546 B1 | 12/2002 | Allpress et al. |
| 6,654,431 B1 | 11/2003 | Barton et al. |
| 6,714,529 B1 | 3/2004 | Tanabe et al. |
| 6,735,244 B1 | 5/2004 | Hasegawa et al. |
| 7,406,141 B1 | 7/2008 | Peeters |

FOREIGN PATENT DOCUMENTS

| | | |
|---|---|---|
| GB | 2 279 213 A | 12/1994 |
| WO | WO 97/07619 | 2/1997 |
| WO | WO 97/08877 | 3/1997 |

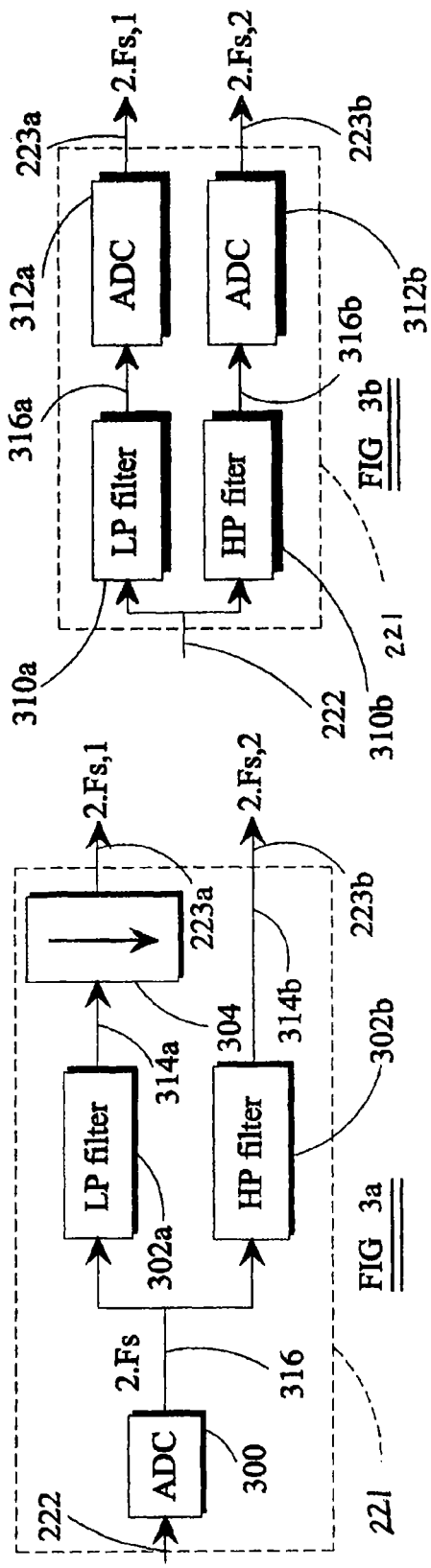
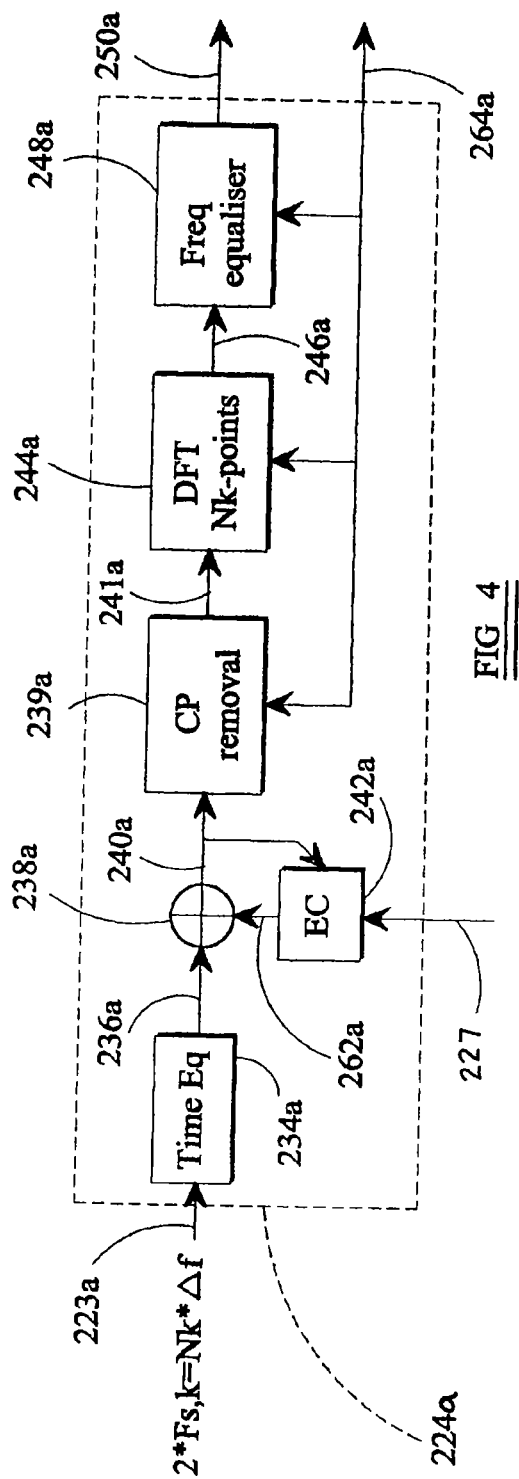
FIG. 3a
FIG. 3b
FIG. 4

US 7,583,742 B2

MULTI-BAND DMT RECEIVER

This application is a continuation of U.S. application Ser. No. 09/686,784, entitled "Multi-Band DMT Receiver," filed Oct. 10, 2000.

FIELD OF THE INVENTION

The present invention relates to the demodulation of a multi-band DMT signal in a receiver, and particularly but not exclusively to the demodulation of a multi-band DMT signal in the transceiver of a modem.

BACKGROUND TO THE INVENTION

Referring to FIG. 1 there is shown an example of a multi-band signal transmitted in the upstream (or uplink) of a communications system. In this example it is assumed that the multi-band signal comprises two bands. As shown in FIG. 1, a first band is defined between the frequencies $f_1$ and $f_2$, and a second band is defined between the frequencies $f_3$ and $f_4$. A downstream frequency band may be provided between the frequencies $f_2$ and $f_3$, and a further downstream frequency band may be provided beyond the frequency $f_4$.

Techniques for transmitting and receiving such multi-band signals are well known. For example, in modem technology a multi-carrier signal having multiple frequency bands is transmitted.

At the receive side, such multi-band signals require a large amount of processing. The processing speed of the receiver is determined by the highest frequency of the multi-band signal. That is, the receiver has to operate at a speed such that the received signals having the highest frequencies can be processed within system constraints.

It is an object of the present invention to provide an improved multi-band DMT receiver in which an improved processing of the received signal is achieved.

SUMMARY OF THE INVENTION

According to a first aspect of the invention there is provided a receiver for receiving a multi-band signal modulated using an inverse discrete Fourier transform, comprising: a plurality of demodulators, each demodulator for demodulating a respective one of the plurality of bands in a multi-band signal wherein each demodulator includes a discrete Fourier transform. Thus, the processing of the multi-band signal is spread amongst more than one demodulator, so that each discrete Fourier transform (DFT) can be optimised for a particular frequency band.

The process speed of each demodulator may then be determined by the respective frequency band. That is, if a particular demodulator processes a frequency band having a high frequency, then a corresponding high sampling speed is required in the respective demodulator. A lower frequency band requires a lower sampling speed in the respective demodulator. Thus the process speed of each demodulator is preferably determined by the respective frequency band of the signal processed therein.

Each demodulator may further include an equaliser connected to the output of the discrete Fourier transform. Each demodulator may further include a filter for filtering the received signal prior to the discrete Fourier transform.

The multi-band signal may be generated by nulling selected tones in the modulator. In addition to. Or alternatively, the multi-band signal may be generated by filtering the output of the modulator.

The receiver may comprise part of a transceiver. In such a transceiver, each demodulator may further include an echo canceller for removing an echo associated with the signal in a transmitter of the transceiver from the received signal. The echo canceller may be connected to remove the echo at the inputs of the discrete Fourier transform. Each echo canceller may comprise an adaptive filter.

In a second aspect the present invention provides a method of demodulating a multi-band signal modulated using an inverse discrete Fourier transform, comprising the step of: providing a demodulator for each respective band in a multi-band signal, wherein each demodulator performs a discrete Fourier transform.

Each demodulator may further comprise an equalisation step. Each demodulator may further filter the received signal prior to the discrete Fourier transform.

The multi-band signal may be generated by nulling selected tones in the modulator. In addition to. Or alternatively, the multi-band signal may be generated by filtering the output of the modulator.

The demodulating step may be carried out in a transceiver. In a transceiver, each demodulator further performs an echo cancellation step to remove an echo associated with a signal in a transmitter of the transceiver from the received signal.

BRIEF DESCRIPTION OF THE FIGURES

The invention will now be described with regard to an illustrative example with reference to the accompanying drawings in which:

FIGS. 3(a) and 3(b) illustrate alternative implementations of the splitter of the receiver of FIG. 2; and FIG. 4 illustrates a DMT receiver in accordance with a preferred embodiment of the present invention.

DESCRIPTION OF PREFERRED EMBODIMENT

In the following illustrative example the present invention will be described by way of reference to a particular implementation in which a modem transceiver transmits a DMT (discrete multi-tone) signal, and the DMT signal is received by a transceiver of another modem.

Figure 2:
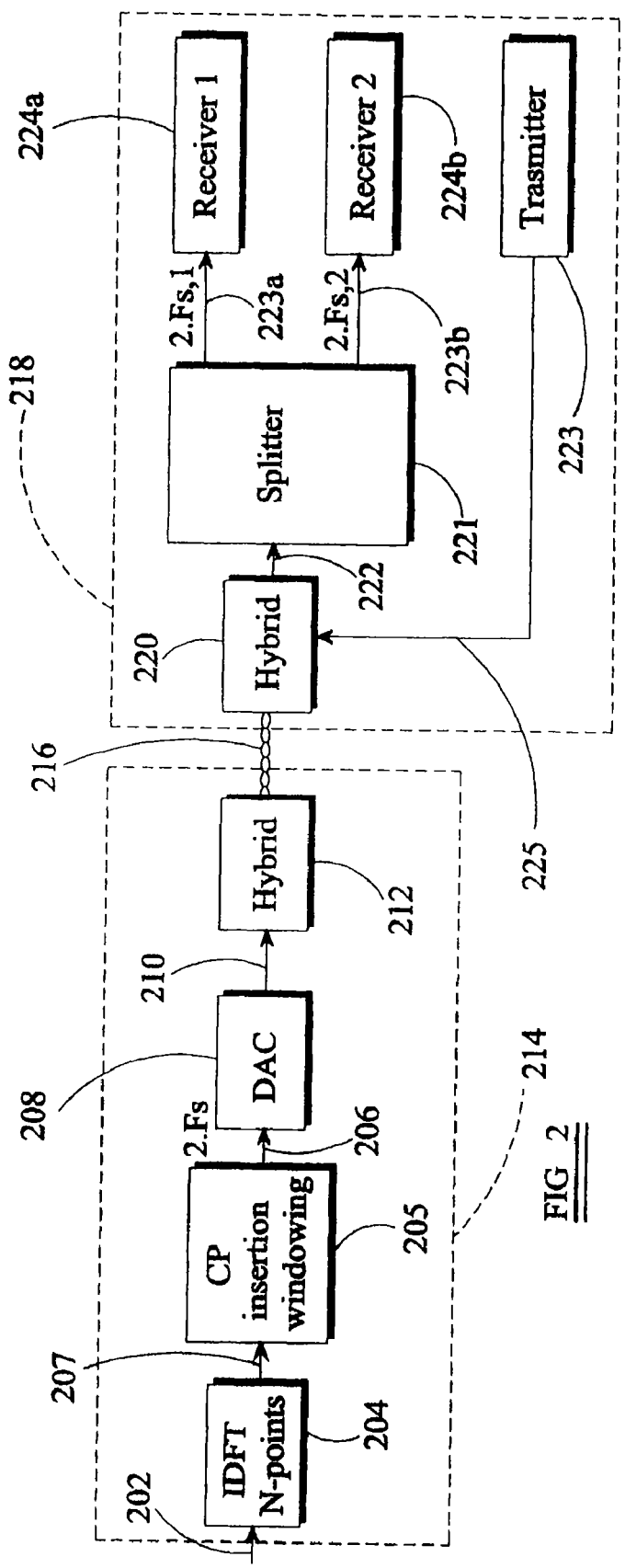
FIG. 2 illustrates a multi-band transmission system in accordance with a preferred implementation of the present invention.

Referring to FIG. 2 there is illustrated a first modem 214 and a second modem 218. For the purposes of this example it is assumed that the first modem 214 transmits a multi-band signal to the second modem 218. Therefore only the transmitter portion of a transceiver of the first modem 214 is discussed in detail and only a receiver portion of the transceiver of the second modem 218 is discussed in detail.

In accordance with known techniques, the transmitter of the first modem 214 includes an inverse discrete Fourier transform 204, a digital to analogue converter 218, and a hybrid 212. As the transmitter described herein is a DMT transmitter, there is also provided a cyclic prefix (CP) insertion block 205. The inverse discrete Fourier transform (IDFT) block 204 receives on a plurality of signal lines 202 data to be encoded for transmission. The thus encoded data is output by the IDFT block 204 in series on line 207. The operation of the IDFT block 204 is outside the scope of the present invention, and its implementation will be well know to one skilled in the art. The CP insertion block inserts a 32 sample guard band in front of the 512 sample symbols generated by the IDFT. As known in the art, the CP insertion includes repeating the last 32 sample of the 512 sample symbol to thereby generate a 544 sample symbol.

Modulated and encoded data output by the CP insertion block 205 on line 206 is converted into an analogue signal on line 210 by the digital to analogue converter 208, and the hybrid 212 transmits the analogue signal on a channel 216.

The plurality of signals on line 202 are provided by a transmitter which generates a discrete multi-tone (DMT) signal with N/2 tones with a tone spacing of ΔF. Consequently the IDFT generates a transform having N points. Thus, the bands of the multi-band signal are generated by nulling certain tones at the input to the IDFT 204. In addition, the nulling may be assisted by appropriate filters at the output of the IDFT 204.

After the CP insertion the symbols may be optionally windowed. Windowing shapes the symbols before transmission in order to reduce the leakage in the adjacent band. Windowing multiplies a certain number of samples at the beginning and end of a symbol by a weighting function. Usually the number of windowed samples is smaller than the length of the guard-band. The shaping of two contiguous symbols could overlap. This windowing principle is used, for example, in the VDSL multi-carrier standard.

Figure 1:
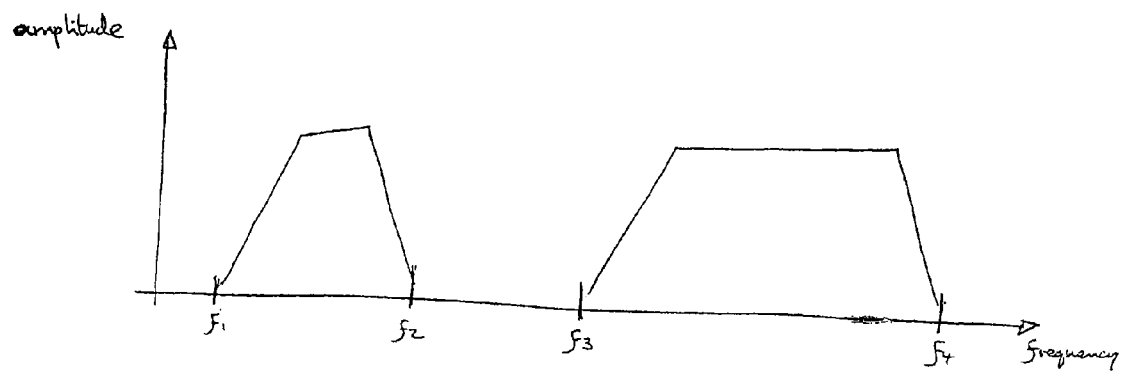
FIG. 1 illustrates the frequency spread of a two-band signal in one direction.

The analogue signal on a channel 216 is received by the transceiver of the modem 218. The transceiver of the modem 218 includes a hybrid 220 and a splitter 221. In accordance with the present invention, the receiver of the modem 218 in addition comprises a plurality, in this example two, of receivers 224a and 224b. In this example it is assumed that the signal transmitted by the transmitter of the first modem 214 corresponds to the signal of FIG. 1 and includes two frequency bands. In general the signal will include a plurality n of frequency bands, and the receiver of the modem 218 will be provided with a plurality n of the receivers 224.

In addition the modem 218 includes transmitter circuitry 223 which provides a signal to be transmitted to the hybrid 220 on line 225.

Each of the demodulators 224a and 224b is constructed identically, and the various components therein have identical reference numerals except for the designation of a or b. Thus the receiver 224a will be described hereinafter, and it will be understood that demodulator 224b is constructed in exactly the same manner.

Before discussing the receivers 224, reference is made to FIGS. 3(a) and 3(b) which illustrate in block diagram form respective digital and analogue implementations of the splitter 221.

In a digital implementation, the signal on line 222 is converted into an analogue signal on line 316 by an analogue to digital converter 300, and then presented to respective low and high pass filters 302a and 302b. The output of the low pass filter 302a on line 314a is processed by block 304, which in turn generates a signal to the first receiver 224a. The block 304 is a downsampler. The principle of this device is to reduce the sampling speed by a certain factor. For example a downsampler by 2 divides the sampling speed by 2 between its input and output. The division is done by taking one sample every two samples. For the input sequence 1 2 3 4 5 6 7 8 9 10 . . . to the downsampler, the output sequence is 1 3 5 7 9 11 . . . . The output of the high pass filter 302b on line 314b forms the signal on line 223b to the second receiver.

In an analogue implementation, the signal on line 222 is provided to respective low and high pass filters 310a and 310b. The outputs of these filters on lines 315a and 316b are converted into digital form by analogue to digital converters 312a and 312b, which generate the signals 223a and 223b to the receivers 224a and 224b.

At the output of the splitter both streams are sampled at their respective Nyquist frequency even if the ADC is running at the Nyquist frequency of the highest band.

Each filter stream in the digital implementation of FIG. 3(a), and each stream in the analogue implementation of FIG. 3(b), can be processed with a DFT of Fs,k/ΔF points. This is because each stream need only process the points for its particular band. Each stream is sampled at a frequency Fs,k, where Fs,k is at least two times the maximum frequency of the band.

The receiver 224a comprises a time equaliser 234a, a subtractor 238a, a cyclic prefix removal block 239a, a discrete Fourier transform (FFT) 244a, a frequency equaliser 248a, and an echo canceller 242a. In this preferred embodiment the echo canceller 242a is comprised of an adaptive filter.

The time equaliser 234a is preferably a finite impulse response (FIR) filter.

The digitised version of the received signal for the particular frequency band is provided on line 223a by a respective one of either the digital or analogue splitters of FIGS. 3(a) and 3(b). In accordance with conventional techniques, the echo canceller 242a preferably comprises an adaptive filter and receives a representation on line 225 of the signal in the transceiver for the modem 218 which is being transmitted by the hybrid 220. The echo canceller 242a then provides an estimate of the echo associated with this transmitted signal on line 262a. The subtractor 238a subtracts the estimate of the echo on line 262a from the time equalised received signal on line 236a, to generate an estimate of the received signal on line 240a. As is known in the art, the signal on line 240a is used to control the echo canceller 242a to adjust the estimate of the echo on line 262a.

The cyclic prefix (CP) removal block 239a operates in the reverse manner to the cyclic prefix (CP) insertion block 205 to remove the 32 samples of the cyclic prefix, forming a guard band, from the 544 samples of the received symbol. When windowing is applied at the transmitter, the cyclic removal process is identical.

The estimate of the received signal on line 241a, after the cyclic prefix removal block, is then input to the discrete Fourier transform 244a. The outputs of the discrete Fourier transform on line 246a are provided to the frequency equaliser 248a for equalisation. The thus equalised signals provided on line 250a are provided for further processing in the receiver of the modem 218. The CP removal block 239a, the discrete Fourier transform 244a and the equaliser 248a each receive a clocked signal on line 264a for controlling the speed of the operations performed therein.

The receiver 224b is similarly constructed.

Thus in accordance with the invention the demodulation of the different bands of the multi-band signal are processed independently such that each modulator can be optimised to perform for that particular frequency band. In the present example it is shown that the receiver 224a demodulates the lower frequency band of FIG. 1, and the receiver 224b demodulates the higher frequency band of FIG. 1. In the example that the highest frequency within the lower frequency band is a frequency of 200 kHz, then the sampling speed of the demodulator 224a must be at least 400 kHz. If, for example, the highest frequency within the higher frequency band is 2 MHz, then the sampling speed must be at least 4 MHz. Thus lower frequencies can be processed at a lower sampling speed.

This contrasts with prior art arrangements, where even low frequency received signals have to be sampled at a sampling speed dictated by the highest possible frequency of the multi-band signal. Therefore in prior art arrangements the 200 kHz signal is processed at a sampling speed of 4 MHz. This is particularly advantageous for the implementation of the echo canceller 242. For the low frequency bands the echo canceller need only be processed at the low sampling speed (that is at the Nyquist speed), rather than always having to be processed at the speed determined by the Nyquist speed of the highest frequency signal.

The main advantage of the invention is that the processing of the lower band, or bands, can be performed at a lower speed. Primarily this means that the time equaliser 234 and the echo canceller 242 consume less CPU processing.

Each of the filters 302 or 310 implement the necessary processing to select the frequency band for the respective receiver.

The above example presents the invention with particular reference to receipt of a discrete multi-tone (DMT) signal. The invention may be advantageously applied in environments such as asymmetric digital subscriber line (ADSL) technology, or very-high-data-rate digital subscriber line (VDSL) technology for example.

What is claimed is:

1. A receiver for use in a multi-carrier transmission system, the receiver configured to receive a multi-tone signal modulated using an inverse discrete Fourier transform, comprising:
   a first demodulator configured to receive a first stream of data from the received modulated multi-tone signal, wherein the first stream of data has a plurality of tones spaced in frequency within a first frequency band and wherein the first demodulator includes:
      a first discrete Fourier transform module configured to utilize a first sampling rate, wherein the first sampling rate is optimized for the first frequency band; and
   a second demodulator configured to receive a second stream of data from the received modulated multi-tone signal, wherein the second stream of data has a plurality of tones spaced in frequency within a second frequency band and wherein the second demodulator includes:
      a second discrete Fourier transform module configured to utilize a second sampling rate, wherein the second sampling rate is optimized for the second frequency band,
      wherein the first sampling rate is different than the second sampling rate.

2. The receiver of claim 1, wherein the first demodulator further comprises:
   a first time equalizer coupled to an input of the first discrete Fourier transform module.

3. The receiver of claim 2, wherein the second demodulator further comprises:
   a second time equalizer coupled to an input of the second discrete Fourier transform module.

4. The receiver of claim 1, wherein the first demodulator further comprises:
   a first frequency equalizer coupled to an output of the first discrete Fourier transform module.

5. The receiver of claim 4, wherein the second demodulator further comprises:
   a second frequency equalizer coupled to an output of the second discrete Fourier transform module.

6. The receiver of claim 1, wherein the first demodulator is configured to receive a downsampled stream of data.

7. The receiver of claim 1, further comprising:
   a splitter for dividing the received modulated multi-tone signal into the first stream of data and the second stream of data.

8. The receiver of claim 1, wherein the first demodulator includes an echo canceller coupled to an input of the first discrete Fourier transform module.

9. The receiver of claim 6, wherein the echo canceller comprises an adaptive filter.

10. A receiver for use in a multicarrier transmission system, wherein the receiver is configured to receive a multi-tone signal modulated using an inverse discrete Fourier transform and having a plurality of tones spaced in frequency in a frequency band, comprising:
    a module for separating the received multi-tone signal into a first stream of data having a first set of tones in the plurality of tones and a second stream of data having a second set of tones in the plurality of tones, wherein the first set of tones is spaced in frequency within a first frequency sub-band of the frequency band and the second set of tones is spaced in frequency within a second frequency sub-band of the frequency band;
    a first discrete Fourier transform module configured to receive the first set of tones and to utilize a first sampling rate to demodulate data in the first set of tones, wherein the first sampling rate is optimized for the first frequency sub-band; and
    a second discrete Fourier transform module configured to receive the second set of tones and to utilize a second sampling rate to demodulate data in the second set of tones, wherein the second sampling rate is optimized for the second frequency band,
    wherein the first sampling rate is different than the second sampling rate.

11. The receiver of claim 10, further comprising:
    a first time equalizer coupled to an input of the first discrete Fourier transform module.

12. The receiver of claim 11, further comprising:
    a second time equalizer coupled to an input of the second discrete Fourier transform module.

13. The receiver of claim 10, further comprising:
    a first frequency equalizer coupled to an output of the first discrete Fourier transform module.

14. The receiver of claim 13, further comprising:
    a second frequency equalizer coupled to an output of the second discrete Fourier transform module.

15. The receiver of claim 12, wherein the first discrete Fourier transform module is configured to receive a downsampled stream of data.

16. The receiver of claim 11, wherein further comprising:
    an echo canceller coupled to an input of the first discrete Fourier transform module.

17. The receiver of claim 16, wherein the echo canceller comprises an adaptive filter.

18. A transceiver for use in a multi-carrier transmission system, comprising:
    a transmitter configured to transmit a data signal; and
    a receiver configured to receive a multi-tone signal modulated using an inverse discrete Fourier transform, wherein the receiver includes:
    a first demodulator configured to receive a first stream of data from the received modulated multi-tone signal, wherein the first stream of data has a plurality of tones spaced in frequency within a first frequency band and wherein the first demodulator includes:

a first discrete Fourier transform module configured to utilize a first sampling rate, wherein the first sampling rate is optimized for the first frequency band, and an echo canceller configured to remove an echo associated with the data signal in the transmitter from the received multi-tone signal, and a second demodulator configured to receive a second stream of data from the received modulated multi-tone signal, wherein the second stream of data has a plurality of tones spaced in frequency within a second frequency band and wherein the second demodulator includes:

a second discrete Fourier transform module configured to utilize a second sampling rate, wherein the second sampling rate is optimized for the second frequency band, wherein the first sampling rate is different than the second sampling rate.

* * * * *